(12) United States Patent
Zhou et al.

(10) Patent No.: US 11,221,625 B2
(45) Date of Patent: *Jan. 11, 2022

(54) ON-SITE NOTIFICATION FROM AUTONOMOUS VEHICLE FOR TRAFFIC SAFETY

(71) Applicant: Pony AI Inc., Grand Cayman (KY)

(72) Inventors: Zixuan Zhou, Palo Alto, CA (US);
Xiang Yu, Santa Clara, CA (US);
Tiancheng Lou, Milpitas, CA (US);
Jun Peng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 47 days.

This patent is subject to a terminal disclaimer.

(21) Appl. No.: 16/816,873

(22) Filed: Mar. 12, 2020

(65) Prior Publication Data

US 2020/0209862 A1 Jul. 2, 2020

Related U.S. Application Data

(63) Continuation of application No. 16/158,200, filed on Oct. 11, 2018, now Pat. No. 10,627,819.

(51) Int. Cl.
| | | |
|---|---|---|
| *B60Q 1/26* | (2006.01) | |
| *G05D 1/00* | (2006.01) | |
| *B60Q 1/50* | (2006.01) | |
| *B60Q 5/00* | (2006.01) | |

(52) U.S. Cl.
CPC ............. *G05D 1/0088* (2013.01); *B60Q 1/50* (2013.01); *B60Q 5/006* (2013.01); *G05D 1/0055* (2013.01); *G05D 2201/0213* (2013.01)

(58) Field of Classification Search
CPC ............ G08G 1/16; G08G 1/166; G08G 1/09; G08G 9/02; B60W 50/14; B60W 30/08; G01S 13/931; H04W 4/46; G05D 1/0088; G05D 1/0055; B60Q 1/50; B60Q 5/006
See application file for complete search history.

(56) References Cited

U.S. PATENT DOCUMENTS

| | | | | |
|---|---|---|---|---|
| 8,525,695 B2 * | 9/2013 | Cemper | ............. | G08B 21/0247 340/901 |
| 8,954,261 B2 | 2/2015 | Das et al. | | |
| 9,517,767 B1 * | 12/2016 | Kentley | ............... | B60W 30/095 |
| 9,701,239 B2 * | 7/2017 | Kentley | .................. | B60L 50/66 |
| 9,989,629 B1 * | 6/2018 | LaChapelle | ........... | G01S 7/4816 |

(Continued)

*Primary Examiner* — Julie B Lieu
(74) *Attorney, Agent, or Firm* — Sheppard Mullin Richter & Hampton LLP

(57) ABSTRACT

A system included and a computer-implemented method performed in an autonomous-driving vehicle are described. The system performs: detecting one or more movable traffic objects; determining one or more target movable traffic objects from the one or more detected movable traffic objects; determining a type of the one or more target movable traffic objects and an traffic object that has a right of way (ROW) in a situation involving the autonomous-driving vehicle. The system further performs: determining a manner of generating a vehicle behavior notification to the target movable traffic object based on the type of the one or more target movable traffic objects and the ROW; and causing a vehicle behavior notification of the determined manner to be generated to the one or more target movable traffic objects.

18 Claims, 5 Drawing Sheets

(56) References Cited

U.S. PATENT DOCUMENTS

| | | | |
|---|---|---|---|
| 10,147,320 B1* | 12/2018 | Ellis | G08G 1/163 |
| 10,156,848 B1* | 12/2018 | Konrardy | G01C 21/362 |
| 2017/0120804 A1* | 5/2017 | Kentley | B60W 30/08 |
| 2017/0253177 A1* | 9/2017 | Kawamata | B60Q 9/008 |
| 2018/0261081 A1* | 9/2018 | Suzuki | G08G 1/005 |
| 2018/0329418 A1* | 11/2018 | Baalke | G05D 1/0246 |
| 2019/0049958 A1* | 2/2019 | Liu | G01S 17/89 |
| 2019/0049997 A1* | 2/2019 | Battles | G05D 1/0297 |
| 2019/0051061 A1* | 2/2019 | Battles | G05D 1/0088 |
| 2019/0061782 A1* | 2/2019 | Cheaz | G08G 1/096716 |
| 2019/0258251 A1* | 8/2019 | Ditty | G06K 9/00805 |
| 2019/0302781 A1* | 10/2019 | Tao | G08G 1/0965 |
| 2019/0329768 A1 | 10/2019 | Shalev-Shwartz et al. | |
| 2021/0094577 A1* | 4/2021 | Shalev-Shwartz | B60W 40/107 |

\* cited by examiner

ON-SITE NOTIFICATION FROM AUTONOMOUS VEHICLE FOR TRAFFIC SAFETY

CROSS-REFERENCE TO RELATED APPLICATION

This application is a continuation of U.S. application Ser. No. 16/158,200, filed Oct. 11, 2018, the content of which is incorporated herein by reference in its entirety.

BACKGROUND

Autonomous-driving vehicles such as vehicles that autonomously operate with limited human inputs or without human inputs are expected in various fields. Since autonomous-driving operations of such autonomous-driving vehicles may not involve human interaction, people outside the autonomous-driving vehicles, such as pedestrians and human drivers on other vehicles, may not be able to guess or perceive intention or behavior of the autonomous-driving vehicles. By contrast, a human driver may provide a hand gesture and/or a high-beam flushing to express the drivers intention (e.g., proceed or yield). It would be useful to provide useful information from autonomous-driving vehicles for traffic safety.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a system included in and a computer-implemented method performed in an autonomous-driving vehicle. The system includes one or more processors; and a memory storing instructions that, when executed by the one or more processors, cause the one or more processors to perform an operation.

In one embodiment, the instruction causes the one or more processors to: detect one or more movable traffic objects; determine one or more target movable traffic objects from the one or more detected movable traffic objects; determine a type of the one or more target movable traffic objects and an traffic object that has right of way (ROW) in a traffic situation involving the autonomous-driving vehicle; determine a manner of generating a vehicle behavior notification to the target movable traffic object based on the type of the one or more target movable traffic objects and the ROW; and cause a vehicle behavior notification of the determined manner to be generated to the one or more target movable traffic objects.

In some embodiments, the determining the one or more target movable traffic objects may comprise: determining a vehicle route of the autonomous-driving vehicle; determining predicted moving paths of the detected one or more movable traffic objects; determining one or more of the detected one or more movable traffic objects that are predicted to be within a predetermined distance from the autonomous-driving vehicle as one or more candidate movable traffic objects, based on the vehicle route and the predicted moving paths of the one or more movable traffic objects; and determining the one or more target movable traffic objects from the one or more candidate movable traffic objects.

In some embodiments, the determining the manner of generating the vehicle behavior notification may comprise: when it is determined that the autonomous-driving vehicle has the ROW, determining whether or not it is safe to proceed, when it is determined that it is safe to proceed, determining a first manner of generation the vehicle behavior notification; when it is determined that it is not safe to proceed, determining a second manner of generation the vehicle behavior notification different from the first manner; and when it is determined that the autonomous-driving vehicle does not have the ROW, determining a third manner of generation the vehicle behavior notification different from the first and second manners.

In some embodiments, the vehicle behavior notification of the first manner may indicate that the autonomous-driving vehicle will proceeds. The vehicle behavior notification of the second manner may indicate that the autonomous-driving vehicle will operate to avoid unsafety. The vehicle behavior notification of the third manner may indicate that the autonomous-driving vehicle will yield.

In some embodiments, each of the one or more target movable traffic objects may be one of a pedestrian, a person on a human-powered vehicle, and a motor vehicle driven by a human driver. The vehicle behavior notification of at least one of the first, second, and third manners corresponding to the pedestrian and the person on the human-powered vehicle may be different from the vehicle behavior notification of the at least one of the first, second, and third manners corresponding to the motor vehicle driven by the human driver.

In some embodiments, the vehicle behavior notification of at least one of the first, second, and third manners corresponding to the pedestrian and the person on the human-powered vehicle may include a first light signal. The vehicle behavior notification of the at least one of the first, second, and third manners corresponding to the motor vehicle driven by the human driver may include a second light signal different from the first light signal.

In some embodiments, at least one of the one or more target movable traffic objects may be another autonomous-driving vehicle. The determining the traffic object that has the ROW may comprise: when the autonomous-driving vehicle is at an intersection, generating a signal indicating a random number; determining priority of the random number with respect to one or more other random numbers indicated by signals from the at least one of the one or more target movable traffic objects according to a predetermined algorithm; and determining the traffic object that has the ROW in accordance with the determined priority.

In some embodiments, the generated signal indicating the random number may comprise a wireless signal transmitted from the autonomous-driving vehicle.

In some embodiments, the determining the traffic object that has the ROW may comprise: determining whether or not at least one of the one or more target movable traffic objects is an emergency vehicle based on siren signals generated thereby; and determining that the emergency vehicle has the ROW.

In some embodiments, the manner of generating the vehicle behavior notification may be determined also based on a distance from the autonomous-driving vehicle to the one or more target movable traffic objects.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
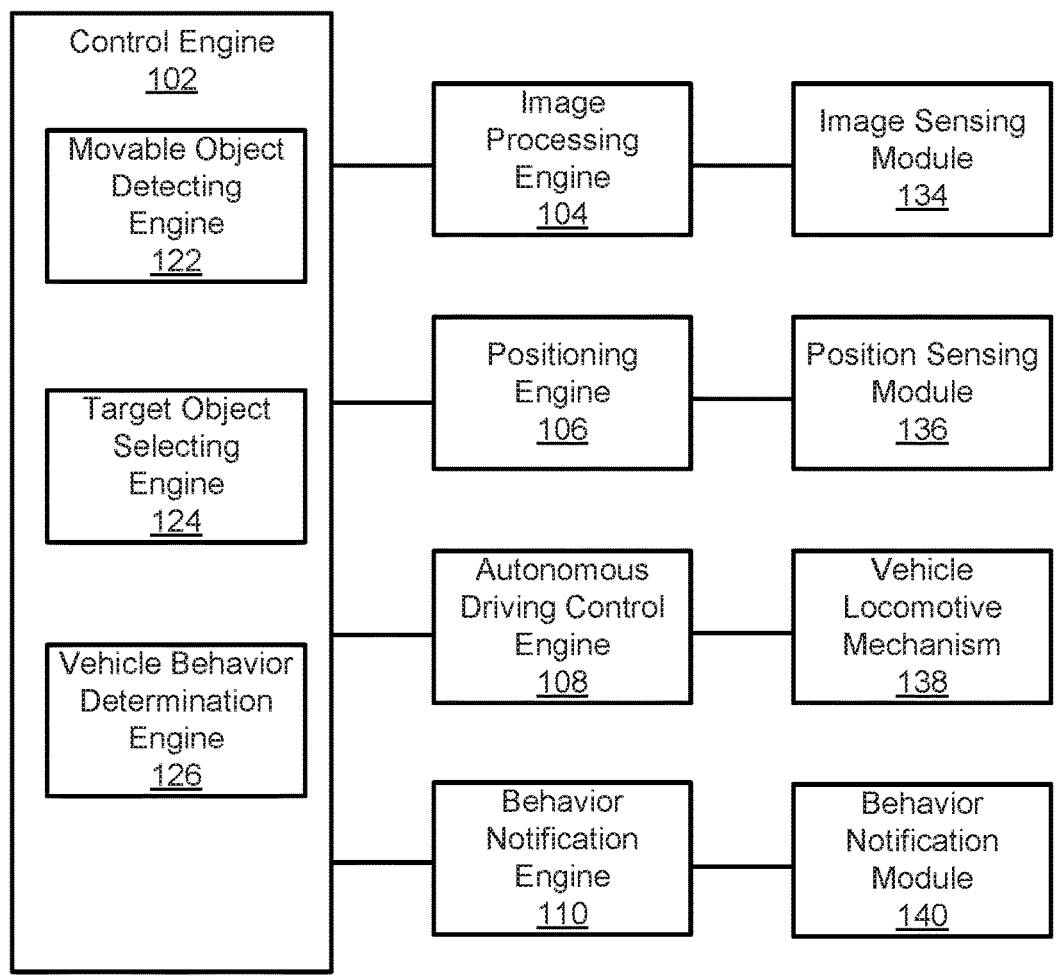
FIG. 1 is a schematic diagram depicting an example of an autonomous-driving vehicle system according to an embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a system included in an autonomous-driving vehicle (or simply autonomous vehicle) and a computer-implemented method performed in an autonomous-driving vehicle. In a specific implementation, the system and the computer-implemented method are intended to provide a vehicle behavior notification to a traffic object that is likely to enter a proximate region to an autonomous-driving vehicle to avoid traffic incidents. The technology in certain implementations of the present disclosure can also make the driving decisions of the autonomous-driving vehicle easily anticipatable by other road users and thus provide such users the comfort that they can safely share the road with autonomous-driving vehicles.

One embodiment provides systems and methods for interacting with surrounding road users (e.g., pedestrians and vehicles, which can be autonomous or human-driven, can be in opposite direction or in the same direction). The system can automatically choose an appropriate method of notification based on environmental conditions. For instance, one method entails emitting a light for a pedestrian who is within the planned trajectory of the autonomous vehicle. The light can be emitted by an appropriate light emitting device (e.g., an LED lamp), so that it is easily noticeable to pedestrians or human drivers of vehicles, yet still safe to humans. The notification may be different depending on the type of road users (e.g., pedestrian or vehicle), who has a right of way (ROW) in the situation, and a distance from an autonomous-driving vehicle to the other road users.

Another embodiment enables determination of priority of ROW way in a situation where it is not apparent who has the ROW. For example, when the autonomous vehicle is at an intersection with stop signs and without traffic signals, and other vehicles came to the intersection almost at the same time as the autonomous vehicle, a process to determine ROW is performed using signals communicated with each other. More particularly, the signals may contain random numbers, respectively, and the priority of ROW may be determined based on the random numbers using a predetermined algorithm.

FIG. 1 is a schematic diagram depicting an example of an autonomous-driving vehicle system 100 according to an embodiment. In the example depicted in FIG. 1, the autonomous-driving vehicle system 100 includes a control engine 102, and an image processing engine 104, a positioning engine 106, an autonomous-driving control engine 108, and a behavior notification engine 110 coupled to the control engine 102. The autonomous-driving vehicle system 100 also includes an image sensing module 134 coupled to the image processing engine 104, a position sensing module 136 coupled to the positioning engine 106, a vehicle locomotive mechanism 138 coupled to the autonomous-driving control engine 108, and a behavior notification module 140 coupled to the behavior notification engine 110.

In the example depicted in FIG. 1, the autonomous-driving vehicle system 100 is intended to represent a system primarily mounted on an autonomous-driving vehicle, which is capable of sensing its environment and navigating with a limited human input or without human input. The "vehicle" discussed in this paper typically includes a vehicle that drives on the ground, such as wheeled vehicles, and may also include a vehicle that flies in the sky (e.g., drones, helicopter, airplanes, and so on). The "vehicle" discussed in this paper may or may not accommodate one or more passengers therein.

In one embodiment, the autonomous-driving vehicle includes a vehicle that controls braking and/or acceleration without real time human input. In another embodiment, the autonomous-driving vehicle includes a vehicle that controls steering without real time human input based on inputs from one or more lens mount units. In another embodiment, the autonomous-driving vehicle includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to mean a human input that is needed to concurrently control movement of a non-autonomous-driving vehicle, such as gear shifting, steering control, braking control, accelerating control, crutching control, and so on.

In one embodiment, the autonomous-driving vehicle system 100 is capable of sensing its environment based on inputs from one or more imaging devices (e.g., camera) mounted on the autonomous-driving vehicle system 100. In an embodiment, the autonomous-driving vehicle system 100 is configured to analyze image data obtained from the one or more imaging devices and identify objects (e.g., traffic signals, road signs, other vehicles, pedestrians, and obstacles) included in images of the analyzed image data. In one embodiment, the autonomous-driving vehicle system 100 is also capable of performing an autonomous-driving operation based on the identified objects. In an embodiment, the autonomous-driving vehicle system 100 is also capable of drive the vehicle so as to follow a traffic stream without hitting the identified objects. For example, the autonomous-driving vehicle system 100 follow traffic signals identified based on image data, follow traffic signs identified based on image data, and drive with a sufficient distance from preceding vehicles.

In the example of FIG. 1, the autonomous-driving vehicle system 100 is also capable of communicating with systems or devices connected to the autonomous-driving vehicle system 100 through a network. In an embodiment, the autonomous-driving vehicle system 100 communicates with a server via the network. For example, the autonomous-driving vehicle system 100 pulls up from the server map information (e.g., local map, parking structure map, floor plan of buildings, and etc.) of a region around the autonomous-driving vehicle. In another example, the autonomous-driving vehicle system 100 periodically notifies information of the autonomous-driving vehicle system 100 such as locations and directions thereof to the server.

In some embodiments, the network is intended to represent a variety of potentially applicable technologies. For example, the network can be used to form a network or part of a larger network. Where two components are co-located on a device, the network can include a bus or other data conduit or plane. Depending upon implementation-specific or other considerations, the network can include wired communication interfaces and wireless communication interfaces for communicating over wired or wireless communication channels. Where a first component is located on a first device and a second component is located on a second (different) device, the network can include a wireless or wired back-end network or LAN. The network can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network can include a private cloud under the control of an enterprise or third party, or a public cloud.

In an embodiment, the autonomous-driving vehicle system 100 communicates with one or more other autonomous-driving vehicle systems via the network. For example, the autonomous-driving vehicle system 100 sends information of a vehicle route of the corresponding autonomous-driving vehicle to the one or more other autonomous-driving vehicle systems, such that traffic incidents such as collisions can be prevented. In another example, the autonomous-driving vehicle system 100 commands one or more other autonomous-driving police systems to proceed to a particular location so as to avoid traffic incidents.

In the example depicted in FIG. 1, the control engine 102 is intended to represent specifically-purposed hardware and software configured to control overall operation of the autonomous-driving vehicle system 100. For example, the control engine 102 controls operations of the image processing engine 104, the positioning engine 106, the autonomous driving control engine 108, and the behavior notification engine 110. The control engine 102 includes a movable object detecting engine 122, a target object selecting engine 124, and a vehicle behavior determination engine 126.

In the example depicted in FIG. 1, the image processing engine 104 is intended to represent specifically-purposed hardware and software configured to carry out image processing of image data of scene images generated by the imaging sensing module 134. In a specific example, the scene images include road signs, traffic signals, lane lines, other vehicles, pedestrians, buildings, and so on. In an embodiment, the image processing engine 104 is configured to detect objects included in each of the scene images. In a specific example, the image processing engine 104 detects objects based on a contour line (high contrast region) included in the scene images.

In the example depicted in FIG. 1, the imaging sensing module 134 is intended to represent specifically-purposed hardware and software configured to capture scene images and generate image data thereof. In a specific implementation, the imaging sensing module 134 includes an image sensor, such as CCD and CMOS sensors, an infrared image sensor, and so on. Depending on a specific implementation and other consideration, the imaging sensing module 134 may include two or more image sensors, and may be or may not be mounted on an autonomous-driving vehicle corresponding to the autonomous-driving vehicle system 100. For example, the imaging sensing module 134 may include one or more images sensors mounted on the autonomous-driving vehicle and one or more images sensors that are not mounted on the autonomous-driving vehicle, and rather placed at external places, such as street lamps, traffic signals, other vehicles, buildings, and so on.

In an embodiment, the image processing engine 104 is configured to identify each object included in the scene images based on image processing of the image data thereof, in accordance with an image recognition technique. For example, according to an image recognition technique, the image processing engine 104 compares image data of each of the detected objects with image data of reference objects that are stored in advance, for example, in the autonomous-driving vehicle system 100 or at an external server for identification of the detected objects. For the image recognition, an applicable machine learning technology (including deep learning) is employed in a specific implementation.

In an embodiment, the image processing engine 104 is configured to generate processed image data and provide the processed image data to the control engine 102. For example, the processed image data include the image data obtained from the imaging devices and metadata of identified objects and metadata of detected objects (but not identified). In a more specific example, the metadata include a relative position (including distance) of each detected object from the autonomous-driving vehicle system 100. In another more specific example, the metadata include a model, make, year, and color of each vehicle included in a scene image, a license plate number of each vehicle included in a scene image, a height, predicted gender, predicted age, and clothes of each pedestrian included in a scene image. In another more specific example, the metadata may also include the number of passengers in one or more vehicles included in the scene image.

In the example depicted in FIG. 1, the positioning engine 106 is intended to represent specifically-purposed hardware and software configured to determine absolute position and orientation of the autonomous-driving vehicle system 100 itself and the detected objects. In an embodiment, the positioning engine 106 determines absolute position and orientation of an autonomous-driving vehicle corresponding to the autonomous-driving vehicle system 100 based on an inputs from the position sensing module 136. In an embodiment, the positioning engine 106 determines absolute position and orientation of one or more detected objects based on the input from the position sensing module 136 and the relative position obtained based on the image processing.

In the example depicted in FIG. 1, the position sensing module 136 intended to represent specifically-purposed hardware and software configured to obtain data to determine a position (e.g. global position) of the autonomous-driving vehicle system 100. In a specific implementation, the position sensing module 136 includes a global positioning system (GPS), a gyro sensor, an acceleration sensor, and so on. Depending on a specific implementation and other consideration, the position sensing module 136 may include two or more positioning sensors, and may be or may not be mounted on an autonomous-driving vehicle corresponding to the autonomous-driving vehicle system 100. For example, the position sensing module 136 may include one or more positioning sensors mounted on the autonomous-driving vehicle and one or more positioning sensors that are not mounted on the autonomous-driving vehicle, and rather placed at external places, such as street lamps, traffic signals, other vehicles, buildings, and so on.

In the example depicted in FIG. 1, the movable object detecting engine 122 is intended to represent specifically-purposed hardware and software configured to detect movable traffic objects from objects detected and identified by the image processing engine 104. In an embodiment, in detecting movable traffic objects, the movable object detecting engine 122 determines whether or not a detected traffic object is an movable traffic object based on attributes of the detected traffic object, such as a type of traffic objects, humans, animals, buildings, vehicles, trees, traffic signals, traffic signs, road obstacles, and so on, and determines that objects determined as humans, animals, vehicles, and so on are determined as the movable traffic objects. Although objects movable by wind power such as trash, objects movable (thrown, projected, pushed, etc.) by human power such as balls, luggage, and so on, are literally "movable," the movable object detecting engine 122 may exclude these "movable traffic objects" that have no physiologic power or human-controllable locomotive power to move from the targets to be detected thereby.

In the example depicted in FIG. 1, the target object selecting engine 124 is intended to represent specifically-purposed hardware and software configured to select target movable traffic object(s) to which a vehicle behavior notification is to be provided. In an embodiment, in selecting the target movable traffic object(s), the target object selecting engine 124 determines one or more candidate movable traffic objects from which the target movable traffic objects are selected. In determining the one or more candidate movable traffic objects, the target object selecting engine 124 determines the candidate movable traffic object(s) from the one or more movable traffic objects according to an applicable criteria. In an embodiment, the applicable criteria may be based on a distance to movable traffic objects. For example, the target object selecting engine 124 may select one or more movable traffic objects within a predetermined distance (e.g., 3 feet) at the current time as the candidate movable traffic objects. In another example, the target object selecting engine 124 may select one or more movable traffic objects distances to which are reducing to a predetermined value within a predetermined period of time as the candidate movable traffic objects.

In an embodiment, the applicable criteria may be based on a vehicle route of the autonomous-driving vehicle and a predicted moving paths of the movable traffic objects. For example, the target object selecting engine 124 determines, as the candidate movable traffic objects, movable traffic objects of which position in their predicted moving paths at a future point in time are within a predetermined distance from the position of the autonomous-driving vehicle in the vehicle route at the future point in time. In another example, the target object selecting engine 124 determines, as the candidate movable traffic objects, movable traffic objects of which position in their predicted moving paths at a future point in time coincide with the position of the autonomous-driving vehicle in the vehicle route at the future point in time. Depending on a specific implementation and other consideration, the vehicle route of the autonomous-driving vehicle is determined by an applicable engine such as the vehicle behavior determination engine 126 as described below, and the target object selecting engine 124 determines the predicted moving paths of the movable traffic objects.

In an embodiment, in determining the predicted moving paths of the movable traffic objects, the target object selecting engine 124 obtains metadata of a movable traffic object and determines a predicted moving path of the movable traffic object based on the obtained metadata. For example, when the movable traffic object is a pedestrian, the target object selecting engine 124 determines a predicted moving path of the pedestrian, such as what positions of a sidewalk a pedestrian passes and what positions of a crosswalk a pedestrian passes, based on metadata of the pedestrian, such as a walking speed, existence of other objects (e.g., other pedestrians and vehicles), body orientation, face direction, and eye direction of the pedestrians, and so on. In another example, when the movable traffic object is a vehicle, the target object selecting engine 124 determines a predicted moving path of the vehicle, such as which lane of a road is going to be used, which parking spot of a parking place (e.g., curb-side parallel parking space) is going to be used, and so on, based on metadata of the vehicle, such as a driving speed, an acceleration or deceleration value, a vehicle orientation, wheel directions, states of lamps (e.g., blinker and tail lamps), existence of other objects (e.g., other pedestrians and vehicles), a car make and specification, and so on. In another example, when the movable traffic object is an animal, the target object selecting engine 124 determines a predicted moving path of the animal based on metadata of the animal, such as type of animal, behavioral attributes of the animal, past move history data of the animal, and so on.

In an embodiment, the target object selecting engine 124 is configured to determine one or more target movable traffic objects from one or more candidate movable traffic objects. In an embodiment, in determining one or more target movable traffic objects from the one or more candidate movable traffic objects, the target object selecting engine 124 may determine the one or more target movable traffic objects according to an applicable criteria. In an embodiment, the applicable criteria may be based on a distance to movable traffic objects. For example, the target object selecting engine 124 may select one or more candidate movable traffic objects closest to the autonomous-driving vehicle (e.g., 3 feet) at the current time as the target movable traffic objects. In another example, the target object selecting engine 124 may select one or more candidate movable traffic objects distances to which becomes closest within a predetermined period of time as the candidate movable traffic objects. In an embodiment, the applicable criteria may be based on an extent of risk of traffic incident involving the candidate movable traffic object. For example, the target object selecting engine 124 may select one or more candidate movable traffic objects that has a highest risk of traffic incident or one or more candidate movable objects of which risk of traffic incident is above a threshold, as the target movable traffic objects. Depending on a specific implementation and other consideration, the risk of traffic incident may be calculated based on various algorithm including a model-based algorithm, a history-matching-based algorithm, and so on.

In an embodiment, the target object selecting engine 124 is configured to determine predicted reactive movement of the target movable traffic objects when directed alert notifications are provided to the target movable traffic objects. Depending on a specific implementation and other consideration, the target object selecting engine 124 may determine the predicted reactive movement based on statistic data (e.g., past reactive movement) associated with a specific type of notification and target movable traffic object, physiological data (e.g., reactive speed) associated with specific type of notification and target movable traffic object, and so on.

In the example depicted in FIG. 1, the vehicle behavior determination engine 126 is intended to represent specifically-purposed hardware and software configured to determine behavior of the autonomous-driving vehicle system 100. In an embodiment, the vehicle behavior determination engine 126 autonomously determines behavior of the autonomous-driving vehicle system 100. More specifically, the vehicle behavior determination engine 126 determines a vehicle route of the autonomous-driving vehicle. In an embodiment, the vehicle route includes a global vehicle route including which road to be used and which intersection to make a turn, and so on, and/or a local vehicle route including which lane of a road to be used, which parking spot of a parking place (e.g., curb-side parallel parking space) to be used, and so on. In an embodiment, the vehicle behavior determination engine 126 determines the vehicle route based on various applicable criteria, such as a current location, a destination, traffic conditions (e.g., congestion, speed limits, number of traffic signals, etc.), weather conditions, environmental conditions (e.g., time, brightness, etc.), geographic crime rates, number of intersection turns, existence of obstacles on roads, etc. In an embodiment, the vehicle behavior determination engine 126 subordinately determines behavior of the autonomous-driving vehicle system 100 based on instructions from an external system (e.g., autonomous-driving vehicle systems of other vehicles, a traffic control server, etc.).

In the example depicted in FIG. 1, the autonomous-driving control engine 108 is intended to represent specifically-purposed hardware and software configured to perform an autonomous-driving operation of the autonomous-driving vehicle system 100 based on the determined behavior of the autonomous-driving vehicle system 100. For example, when the vehicle behavior determination engine 126 determines to change a lane on a road, the autonomous-driving control engine 108 causes the vehicle locomotive mechanism 138 to flash blinker lamps, direct wheels to the lane, and return position of the wheels after changing the lame and stop blinker lamps. For example, when the vehicle behavior determination engine 126 determines to proceed to a specific location (e.g., a parking spot), the autonomous-driving control engine 108 causes the vehicle locomotive mechanism 138 to drive to the specific location. For example, when the vehicle behavior determination engine 126 determines to take a specific route, the autonomous-driving control engine 108 causes the vehicle locomotive mechanism 138 to drive taking the specific route.

In an embodiment, the autonomous-driving control engine 108 is configured to control the vehicle locomotive mechanism 138 based on the predicted reactive movement of the target movable traffic object(s). For example, when a target movable traffic object is a pedestrian and the reactive movement of the target movable traffic object is stop of walk, the autonomous-driving control engine 108 controls the vehicle locomotive mechanism 138 to drive apart from or avoid a stop position of the target movable traffic object. In another example, when a target movable traffic object is an animal and the reactive movement of the target movable traffic object is rushing in a specific direction, the autonomous-driving control engine 108 controls the vehicle locomotive mechanism 138 to drive the autonomous-driving vehicle in a direction different from the specific direction.

In the example depicted in FIG. 1, the vehicle locomotive mechanism 138 is intended to represent specifically-purposed mechanism to drive an autonomous-driving vehicle. Depending on a specific implementation and other consideration, the vehicle locomotive mechanism 138 may include an electrical power and drive unit, such as a motor, to drive the autonomous-driving vehicle, and/or a fuel-based power and drive unit such as an engine. Depending on a specific implementation and other consideration, the vehicle locomotive mechanism 138 may be controlled based on mechanical control actions triggered by the autonomous-driving control engine 108 and/or electrical signals generated by the autonomous-driving control engine 108.

In the example depicted in FIG. 1, the behavior notification engine 110 is intended to represent specifically-purposed hardware and software configured to determine a manner of generating a vehicle behavior notification to the target movable traffic object. In some embodiments, the behavior notification engine 110 determines the manner of generating the vehicle behavior notification, based on one or more of a type of the target movable traffic object, what traffic object has a right of way (ROW), and whether or not it is safe to proceed. In some embodiments, the vehicle behavior notification may include one or more of a visual notification and an acoustic notification. For example, a visual notification may be a light emitted from a light emitting device (e.g., lamp) and/or an image displayed on a display device (e.g., LED display). The light emitting device and/or the display device may be disposed at applicable positions of the autonomous-driving vehicle, such as on top of a roof, adjacent to a front light, inside a passenger area, etc. An example of a detailed process to determine a manner of generating a vehicle behavior notification will be described below with reference to FIG. 4.

In the example depicted in FIG. 1, the behavior notification module 140 is intended to represent specifically-purposed module configured to generate a vehicle behavior notification in accordance with the manner determined by the behavior notification engine 110. In an embodiment, in generating a visual vehicle behavior notification, the directed alert notification module 140 includes a light emitting device and/or other directive optical devices to deliver the vehicle behavior notification to a target movable traffic object. In a specific implementation, the light emitting device is configured to generate light. In a specific implementation, a color, a flushing pattern, and/or a brightness of light may be variable depending on the manner of vehicle behavior notification. Two or more light emitting devices configured to generated different types of light may be provided. In an embodiment, in generating an acoustic vehicle behavior notification, the behavior notification module 140 includes a speaker to deliver the vehicle behavior notification to a target movable traffic object. Signaling sound and/or voice may be generated from the speaker.

Figure 2:
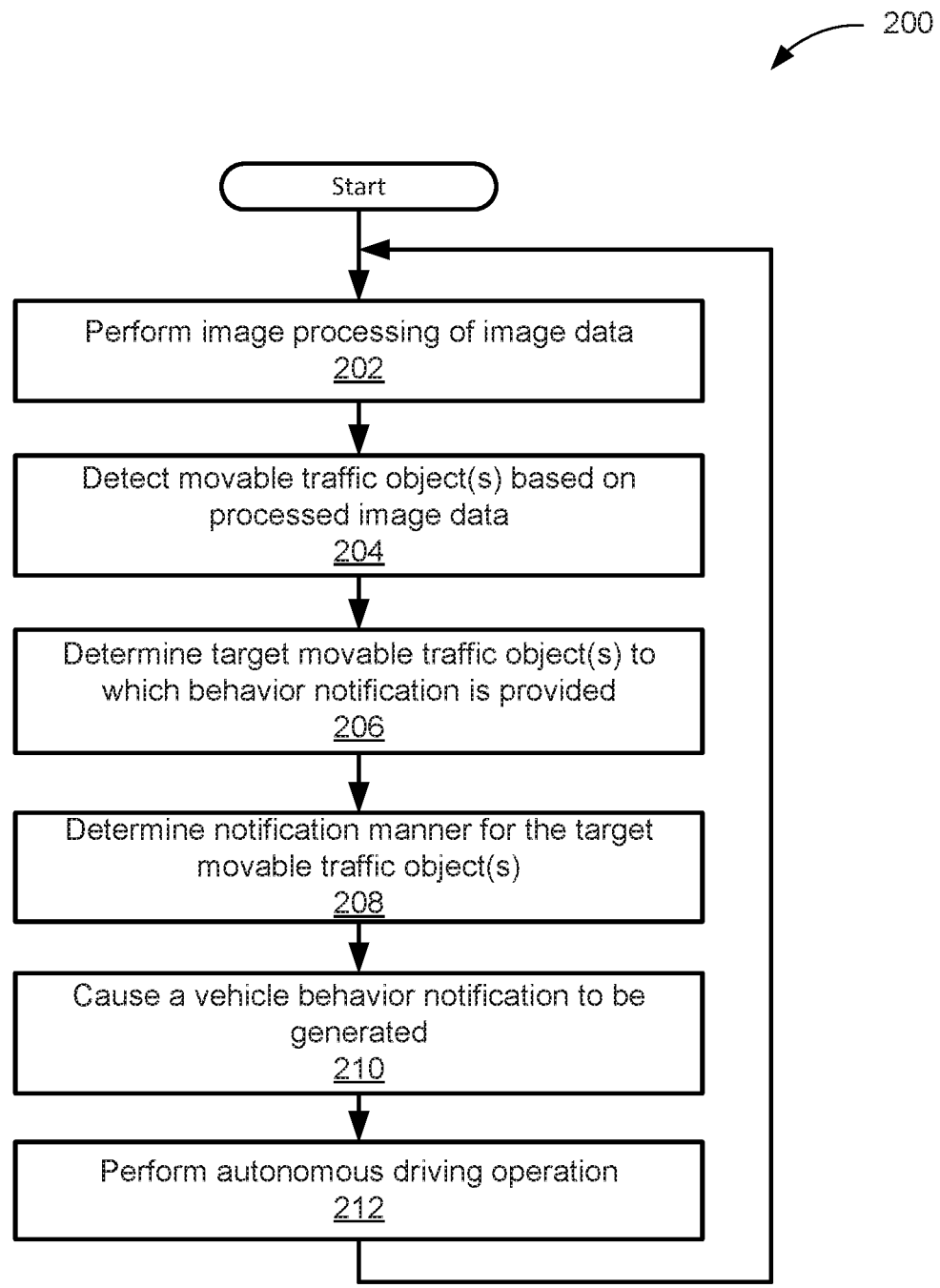
FIG. 2 depicts a flowchart of an example of a method for operating an autonomous-driving vehicle system.

FIG. 2 depicts a flowchart 200 of an example of a method for operating an autonomous-driving vehicle system. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In the example of FIG. 2, the flowchart 200 starts at module 202, with performing image processing of image data. An applicable engine for performing image processing, such as an image processing engine (e.g., the image processing engine 104 in FIG. 1) described in this paper, can perform the image processing. In an embodiment, traffic objects included in scene images captured by imaging devices are detected, the detected traffic objects are then identified according to an image recognition technique, and relative position and orientation of the detected traffic objects from an autonomous-driving vehicle system are determined in the module 202.

In the example of FIG. 2, the flowchart 200 continues to module 204, with detecting movable traffic object(s) based on processed image data. An applicable engine for detecting movable traffic objects, such as a movable object detecting engine (e.g., the movable object detecting engine 122 in FIG. 1) described in this paper, can detect movable traffic object(s) based on processed image data. In an embodiment, whether or not a detected traffic object is an movable traffic object is determined based on attributes of the detected traffic object, such as a type of traffic objects, humans, animals, buildings, vehicles, trees, traffic signals, traffic signs, road obstacles, and so on. For example, traffic objects movable based on their intentions and/or control programs, such as humans, animals, and vehicles (both non-autonomous-driving and autonomous-driving vehicles) are determined as movable traffic objects. In an embodiment, the movable traffic object(s) may be detected based on a non-image-based detection technique such as techniques employing Lidar, ultrasonic waves, and so on.

In the example of FIG. 2, the flowchart 200 continues to module 206, with determining target movable traffic object(s) to which a vehicle behavior notification is provided. An applicable engine for determining target movable traffic object(s) to which a vehicle behavior notification is provided, such as a target movable object selecting engine (e.g., the target movable object selecting engine 124 in FIG. 1) described in this paper, can determine target movable traffic object(s) to which a vehicle behavior notification is provided. In an embodiment, in determining the target movable traffic object(s), the target movable traffic object(s) are selected from the one or more movable traffic objects based on an applicable criteria, such as a distance to a movable traffic object and a time period before a distance to a movable traffic object decreases to a minimum distance (e.g., contact with the candidate movable traffic object) below a predetermined distance (e.g., 3-10 feet), and one or more movable traffic objects involving one of the highest risks of traffic incident (e.g., shortest distance and/or shortest time period) may be selected as the one or more target movable traffic objects.

In the example of FIG. 2, the flowchart 200 continues to module 208, with determining a manner of a vehicle behavior notification to be generated. An applicable engine for determining a manner of a vehicle behavior such as a vehicle behavior notification determination engine (e.g., the vehicle behavior notification engine 110 in FIG. 1) described in this paper, can determine the manner of the vehicle behavior notification to be generated. In an embodiment, the manner of generating a vehicle behavior notification includes a type of the vehicle behavior notification and the timing at which the vehicle behavior notification is generated. A detailed example of determining the manner of a vehicle behavior notification will be described with reference to FIG. 4 below.

In the example of FIG. 2, the flowchart 200 continues to module 210, with causing a vehicle behavior notification to be generated according to the determined manner of vehicle behavior notification. An applicable engine for causing a vehicle behavior notification to be generated, such as a vehicle behavior notification engine (e.g., the vehicle behavior notification engine 110 in FIG. 1) described in this paper, can cause the vehicle behavior notification to be generated by an applicable module for generating the vehicle behavior notification, such as a vehicle behavior notification module (e.g., the vehicle behavior notification module 140 in FIG. 1) according to the determined manner of vehicle behavior notification. In an embodiment, the vehicle behavior notification is of a determined type (e.g., a visual directed alert notification) at determined timing (e.g., when a pedestrian is about to cross a crosswalk).

In the example of FIG. 2, the flowchart 200 continues to module 212, with performing an autonomous driving operation. An applicable engine for performing an autonomous driving operation, such as an autonomous driving control engine (e.g., the autonomous driving control engine 108 in FIG. 1) described in this paper, can perform the autonomous driving operation by controlling an applicable locomotive mechanism (e.g., the vehicle locomotive mechanism 138 in FIG. 1) of an autonomous-driving vehicle. In an embodiment, in performing an autonomous driving operation, predicted movement of the target movable traffic object(s) in response to the vehicle behavior notification is determined, and the locomotive mechanism of the autonomous-driving vehicle is controlled based on the predicted movement of the target movable traffic object(s). In the example of FIG. 2, the flowchart 200 returns to module 202, and module 202 through module 212 are repeated.

Figure 3:
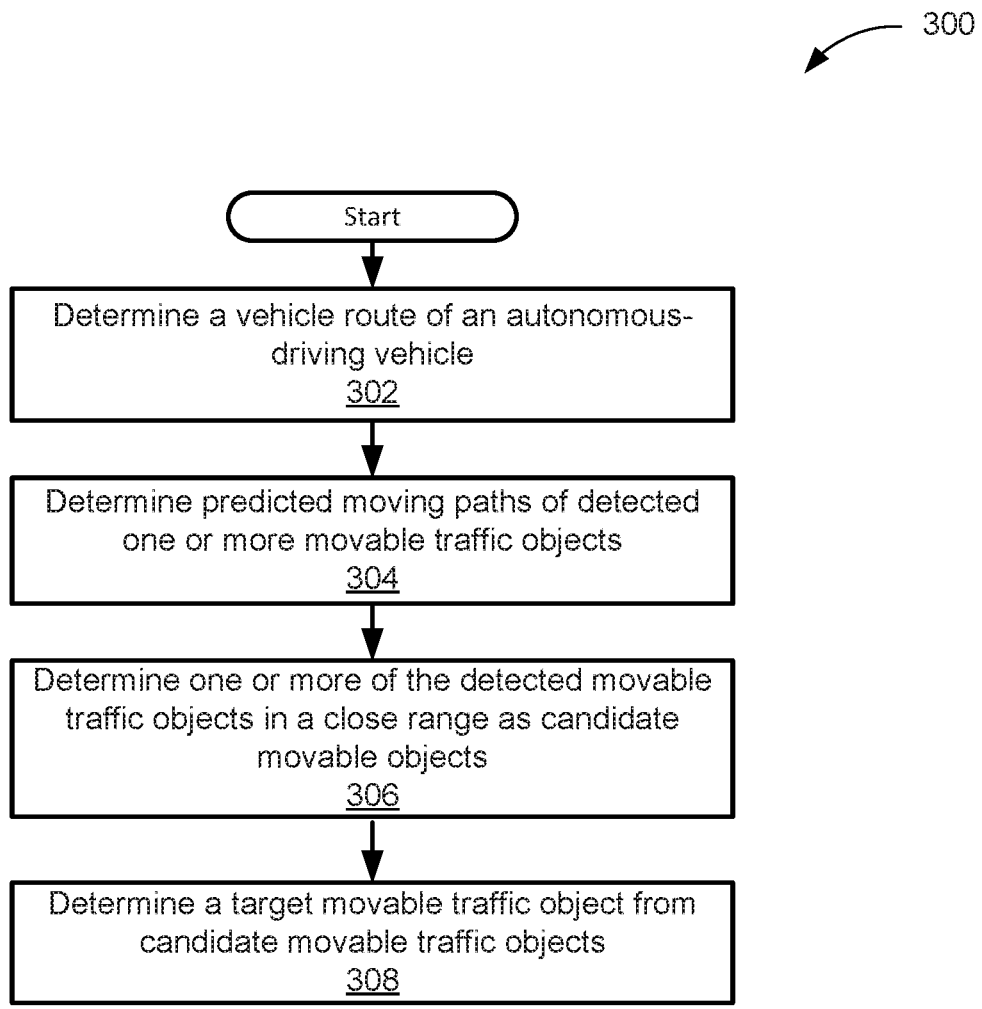
FIG. 3 depicts a flowchart of an example of a method for determining a target movable object to which a behavior notification is generated.

FIG. 3 depicts a flowchart 300 of an example of a method for determining a target movable object to which a directed alert notification is generated. In the example of FIG. 3, the flowchart 300 starts at module 302, with determining a vehicle route of an autonomous-driving vehicle. An applicable engine for determining a vehicle route of an autonomous-driving vehicle, such as a vehicle behavior determination engine (e.g., the vehicle behavior determination engine 126 in FIG. 1) described in this paper, can determine the vehicle route of the autonomous-driving vehicle. In an embodiment, the vehicle route includes a global vehicle route including which road to be used and which intersection to make a turn, and so on, and/or a local vehicle route including which lane of a road to be used, which parking spot of a parking place (e.g., curb-side parallel parking space) to be used, and so on. In an embodiment, the vehicle route is determined based on various applicable criteria, such as a current location, a destination, traffic conditions (e.g., congestion, speed limits, number of traffic signals, etc.), weather conditions, environmental conditions (e.g., time, brightness, etc.), geographic crime rates, number of intersection turns, existence of obstacles on roads, etc.

In the example of FIG. 3, the flowchart 300 continues to module 304, with determining predicted moving paths of detected one or more movable traffic objects. An applicable engine for determining predicted moving paths of detected one or more movable traffic objects, such as a target object selection engine (e.g., the target object selection engine 124 in FIG. 1) described in this paper, can determine the predicted moving paths of the detected one or more movable traffic objects. In an embodiment, a predicted moving path of a movable object includes a local pedestrian route such as what positions of a sidewalk a pedestrian passes, what positions of a crosswalk a pedestrian passes, when the movable traffic object is a pedestrian. In an embodiment, a predicted moving path of a movable traffic object includes a local vehicle route such as which lane of a road is going to be used, which parking spot of a parking place (e.g., curb-side parallel parking space) is going to be used, and so on, when the movable traffic object is a vehicle. In an embodiment, a predicted moving path of a movable traffic object includes a local animal route, when the movable traffic object is an animal. In an embodiment, a predicted moving path of a movable traffic object is determined based on various applicable criteria.

For example, when the movable traffic object is a pedestrian, the criteria to determine the predicted moving path may include a current pedestrian state, such as a current walking speed, a current orientation of the body, a current direction of the face, a current direction of the eyes, and so on, and a current environmental state, such as state of traffic signals therearound, state of other pedestrians and vehicles therearound, and so on. In another example, when the movable traffic object is a vehicle, the criteria to determine the predicted moving path may include a current vehicle state, such as a current driving speed, a current power (engine) state (e.g., on or off), a current orientation of the vehicle, a current acceleration (or deceleration) of the vehicle, a current lamp state (e.g., blinker lamps and/or tail lamps), a current direction of tires, a current position of the vehicle on road (e.g., lane), and so on, and a current environmental state, such as state of traffic signals therearound, state of other vehicles and other pedestrians therearound, and so on. In another example, when the movable traffic object is an animal, the criteria to determine the predicted moving path may include a type of the animal, previous moving paths taken by animals, and so on.

In the example of FIG. 3, the flowchart 300 continues to module 306, with determining one or more of the detected movable traffic objects in a close range of the autonomous-driving vehicle as candidate movable traffic objects. An applicable engine for determining candidate movable traffic objects, such as a target object selection engine (e.g., the target object selection engine 124 in FIG. 1) described in this paper, can determine the candidate movable traffic objects. In an embodiment, the movable traffic objects of which predicted moving path crosses the vehicle route of the autonomous-driving vehicle are determined as the candidate movable traffic objects. In another embodiment, the movable traffic objects of which position in the predicted moving path becomes within a predetermined distance (e.g., 5 feet) from a position of the autonomous-driving vehicle in the vehicle route at a point in time are determined as the candidate movable traffic objects.

In the example of FIG. 3, the flowchart 300 continues to module 308, with determining one or more target movable traffic objects from the candidate movable traffic objects. An applicable engine for determining one or more target movable traffic objects, such as a target object selection engine (e.g., the target object selection engine 124 in FIG. 1) described in this paper, can determine the one or more target movable traffic objects. In an embodiment, one or more of the candidate movable traffic objects of which distance from the autonomous-driving vehicle becomes shortest may be selected as the one or more target movable traffic objects. In an embodiment, one or more of the candidate movable traffic objects of which risk of traffic incident is the largest, which may be calculated in accordance with specific algorithm including machine learning technology, may be selected as the one or more target movable traffic objects. Depending on a specific implementation and other consideration, one target movable traffic object may be selected at a time, or multiple target movable traffic objects may be selected together.

Figure 4:
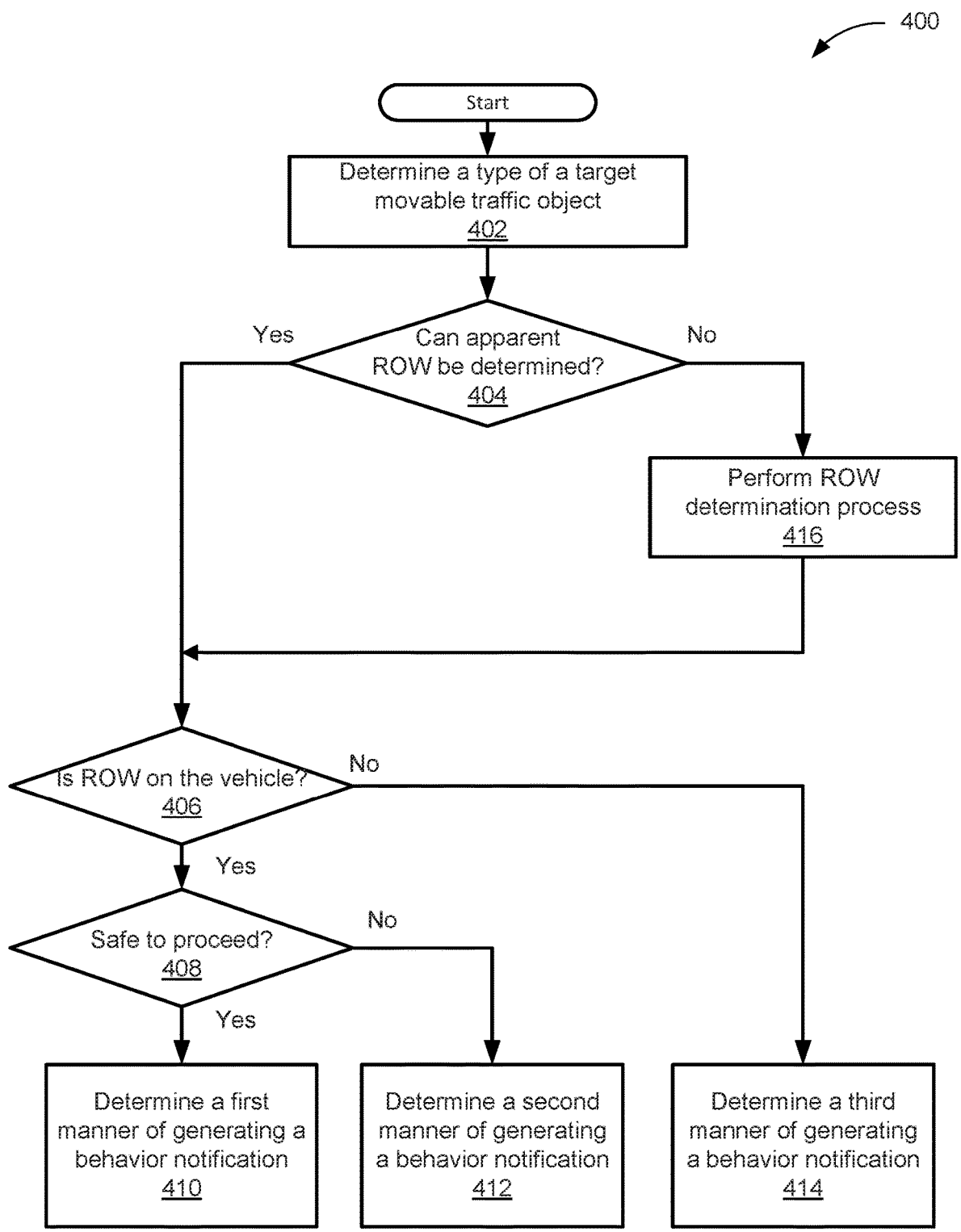
FIG. 4 depicts a flowchart of an example of a method for determining a manner of generating a vehicle behavior notification.

FIG. 4 depicts a flowchart 400 of an example of a method for determining a manner of generating a vehicle behavior notification. An applicable engine, such as a behavior notification engine (e.g., the behavior notification engine 110 in FIG. 1) described in this paper, can perform modules of the flowchart 400. In the example of FIG. 4, the flowchart 400 starts at module 402, with determining a type of a target movable traffic object. In some embodiments, the type of the target movable traffic object may be one of a pedestrian, a person on a human-powered vehicle (e.g., bicycle), a motor vehicle (e.g., passenger motor car, motor bike, truck, etc.), and an emergency vehicle (e.g., police car and fire truck).

In the example of FIG. 4, the flowchart 400 continues to module 404, with determining whether apparent ROW can be determined in a situation involving the corresponding autonomous-driving vehicle for generating the vehicle behavior notification. In some embodiments, apparent ROW can be determined based on a traffic rule in the corresponding jurisdiction and traffic signals and signs at the location of the autonomous-driving vehicle. For example, a traffic signal ahead of the autonomous-driving vehicle is green and no emergency vehicle is around the location, vehicles on the road with the green signal has apparent ROW, and the other traffic objects (e.g., vehicles and pedestrians) on crossing roads do not have apparent ROW. In another example, at a four-way intersection with a stop sign on each way, the ROW may be assigned to vehicles in the order the vehicles reached the corresponding stop line. In still another example, in a multiple-lane road in a direction, a first vehicle on a first lane may have apparent ROW and a second vehicle running adjacent to the first vehicle on a second lane switching to the first lane may not have apparent ROW. In still another example, it is not clear whether or not a pedestrian at an intersection without traffic signals is trying to cross a road, there may not be apparent ROW on the autonomous-driving vehicle. In such a case, if there is a sufficient time gap (e.g., 1 sec) among vehicles reaching stop lines, apparent ROW may exist on a vehicle reaching first to the corresponding stop line. To the contrary, if there is not the sufficient time gap among vehicles reaching stop lines, apparent ROW may not exist on all vehicles reading to the corresponding stop lines.

In the example of FIG. 4, when it is determined that apparent ROW can be determined at module 404 (Yes), (and after module 416 described below), the flowchart 400 continues to module 406, with determining whether or not the ROW is on the corresponding autonomous-driving vehicle.

In the example of FIG. 4, when it is determined that the ROW is on the corresponding autonomous-driving vehicle at module 406 (Yes), the flowchart 400 continues to module 408, with determining whether or not the corresponding autonomous-driving vehicle is safe to proceed. For example, it may not be safe to proceed when a pedestrian is still crossing a crosswalk though a traffic signal turned red for the pedestrian and another traffic signal turned green for the autonomous-driving vehicle, although the autonomous-driving vehicle now has ROW. In another example, it may not be safe to proceed when another vehicle running on a next lane is cutting in in front of the autonomous-driving vehicle, although the autonomous-driving vehicle now has ROW on the lane. In still another example, it may not be safe to proceed when another vehicle ignores a stop sign at a four-way intersection, although the ROW is now given to the autonomous-driving vehicle. To the contrary, when all traffic objects are compliant with the traffic rule, it may be safe to proceed.

In the example of FIG. 4, when it is determined that the corresponding autonomous-driving vehicle is safe to proceed at module 408 (Yes), the flowchart 400 continues to module 410, with determining a first manner of generating a vehicle behavior notification. In some embodiments, the first manner of generating the vehicle behavior notification may be a notification indicating that the autonomous-driving vehicle will proceed. In some embodiments, the first manner of generating the vehicle behavior notification may be a notification indicating that the autonomous-driving vehicle will yield although the ROW is on the autonomous-driving vehicle. For example, such an yielding notification may be generated to a vehicle requesting to proceed to the way the autonomous-driving vehicle runs. The notification may be made by a light signal and/or an acoustic signal (e.g., voice). In some embodiments, the first manner of generating a vehicle behavior notification may be different depending on the type of the target movable traffic object. For example, a first light signal may be generated for a pedestrian and a person on a human-powered vehicle, and a second light signal may be generated for motor vehicles driven by a human driver. In a specific implementation, the second light signal may be different from the first light signal, in color, flashing pattern, brightness, etc., for distinction of the aimed target traffic object.

In the example of FIG. 4, when it is determined that the corresponding autonomous-driving vehicle is not safe to proceed at module 408 (No), the flowchart 400 continues to module 412, with determining a second manner of generating a vehicle behavior notification different from the first manner. In some embodiments, the second manner of generating the vehicle behavior notification may be a notification requesting the target movable traffic object to yield the way to the autonomous-driving vehicle. For example, such a requesting notification may be generated to another vehicle coming to the way of the autonomous-driving vehicle. In some embodiments, the second manner of generating the vehicle behavior notification may be a notification indicating that the autonomous-driving vehicle will yield although the ROW is on the autonomous-driving vehicle. For example, such an yielding notification may be generated to a pedestrian who has not cross a crosswalk although the signal turned red. The notification may be made by a light signal and/or an acoustic signal (e.g., voice). In some embodiments, the second manner of generating a vehicle behavior notification may be different depending on the type of the target movable traffic object in the same or similar manner as the first manner of generating the vehicle behavior notification. When both the first and second manners are based on light signals, color, flashing pattern, brightness, etc. may be different.

In the example of FIG. 4, when it is determined that the ROW is not on the corresponding autonomous-driving vehicle at module 406 (No), the flowchart 400 continues to module 414, with determining a third manner of generating a vehicle behavior notification different from the first and second manners. In some embodiments, the third manner of generating the vehicle behavior notification may be a notification requesting to yield the way for the autonomous-driving vehicle. For example, such a requesting notification may be generated to a vehicle coming to the way of the autonomous-driving vehicle. In some embodiments, the third manner of generating a vehicle behavior notification may be different depending on the type of the target movable traffic object in the same or similar manner as the first and/or second manner of generating the vehicle behavior notification. When both the first and/or second manners and the third manner are based on light signals, color, flashing pattern, brightness, etc. may be different.

In some embodiments, the manner of generating the vehicle behavior notification determined in one or more of modules 410, 412, and 414 may be further based on a distance from the autonomous-driving vehicle to the one or more target movable traffic objects. For example, when a light signal is generated for the vehicle behavior notification, a flashing speed of the light signal may become faster as the one or more target movable traffic objects approaches the autonomous-driving vehicle. In another example, when a face image is displayed on a display device for the vehicle behavior notification, the face expression may change as the one or more target movable traffic objects approaches the autonomous-driving vehicle.

In the example of FIG. 4, when it is determined that apparent ROW can be determined at module 404 (No), the flowchart 400 continues to module 416, with performing an ROW determination process. In some embodiments, when the target movable traffic object is a pedestrian at an intersection, the ROW determination process may involve determining whether or not the pedestrian is going to pass a crosswalk. When it is determined that the pedestrian is going to pass a crosswalk, ROW may be determined to be on the pedestrian.

In some embodiments, when autonomous-driving vehicle is at an intersection (e.g., stop signs without signals) with one or more other autonomous-driving vehicles from different directions, the ROW determination process may involve generating a signal (e.g., wireless signal) indicating a random number from each of the autonomous-driving vehicles at the intersection. In this case, after each of the autonomous-driving vehicles at the intersection generates a signal indicating a random number, priority of the random numbers may be determined according to a predetermined algorithm, the traffic object that has the ROW may be determined in accordance with the determined priority. The determination of the priority may be carried out one or more of the autonomous-driving vehicles at the intersection, or any applicable system located at the intersection. The predetermined algorithm may be that priority is given in the order of closeness to a reference number, which may be generated also randomly. Any applicable algorithm to determine priority among a plurality of autonomous-driving vehicles at the intersection may be employed.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
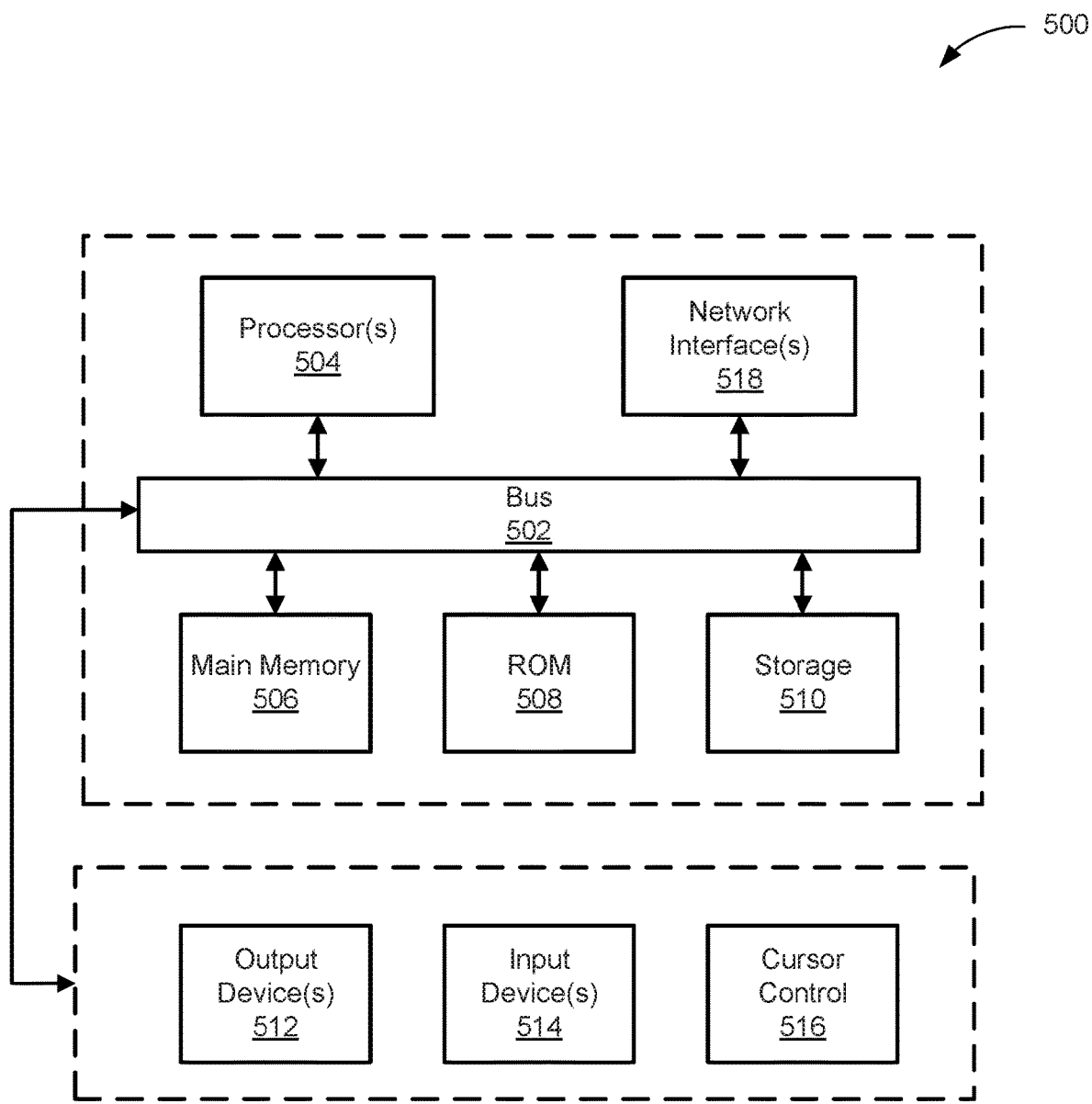
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A notification system for an autonomous-driving vehicle, comprising:
   one or more processors; and
   a memory storing instructions that, when executed by the one or more processors, cause the one or more processors to perform a method comprising:
   determining a target traffic object from traffic objects in an environment within which the autonomous-driving vehicle operates, wherein determining the target traffic object from the traffic objects comprises:
   determining a route associated with the autonomous-driving vehicle;
   determining predicted routes associated with the traffic objects;
   determining, based on the route and the predicted routes, at least one traffic object from the traffic objects that is predicted to be within a predetermined distance of the autonomous-driving vehicle within a predetermined period of time; and identifying the at least one traffic object as the target traffic object;

determining, based at least in part on the target traffic object with respect to the environment, whether the autonomous-driving vehicle has a right of way in the environment; and generating, based on the determination of whether the autonomous-driving vehicle has the right of way, a vehicle behavior notification—to indicate an intent of the autonomous-driving vehicle.

2. The notification system of claim 1, wherein the target traffic object and the traffic objects are identified based on attributes of the target traffic object and the traffic objects.

3. The notification system of claim 2, wherein the attributes of the target traffic object and the traffic objects are captured through sensors onboard the autonomous-driving vehicle, and wherein the sensors onboard the autonomous-driving vehicle include at least one of a Lidar or a camera.

4. The notification system of claim 1, wherein the route associated with the autonomous-driving vehicle is determined based on two or more of a current location, a destination, traffic conditions, weather conditions, environmental conditions, or a number of turns in the route.

5. The notification system of claim 1, wherein the right of way in the environment is determined based on one or more of traffic rules, traffic signals, or traffic signs associated with a location of the autonomous-driving vehicle and in relation to the target traffic object.

6. The notification system of claim 1, wherein generating the vehicle behavior notification for the target traffic object comprises:

determining that the autonomous-driving vehicle has the right of way;

determining, based on traffic conditions, that the autonomous-driving vehicle is able to safely proceed; and generating the vehicle behavior notification to indicate an intent of the autonomous-driving vehicle to proceed.

7. The notification system of claim 1, wherein generating the vehicle behavior notification for the target traffic object comprises:

determining that the autonomous-driving vehicle has the right of way;

determining, based on traffic conditions, that the autonomous-driving vehicle is unable to safely proceed; and generating the vehicle behavior notification to indicate an intent of the autonomous-driving vehicle not to proceed.

8. The notification system of claim 1, wherein generating the vehicle behavior notification for the target traffic object comprises:

determining that the autonomous-driving vehicle does not have the right of way; and generating the vehicle behavior notification to indicate an intent of the autonomous-driving vehicle to yield to the target traffic object.

9. The notification system of claim 1, wherein the vehicle behavior notification is at least one of a visual or an acoustic notification, wherein the visual notification includes at least one of changing a color, a pattern, or brightness associated with light generated by at least one light emitting device associated with the autonomous-driving vehicle.

10. A computer-implemented method performed in an autonomous-driving vehicle comprising:

determining a target traffic object from traffic objects in an environment within which the autonomous-driving vehicle operates, wherein determining the target traffic object from the traffic objects comprises:

determining a route associated with the autonomous-driving vehicle;

determining predicted routes associated with the traffic objects;

determining, based on the route and the predicted routes, at least one traffic object from the traffic objects that is predicted to be within a predetermined distance of the autonomous-driving vehicle within a predetermined period of time; and identifying the at least one traffic object as the target traffic object;

determining, based at least in part on the target traffic object with respect to the environment, whether the autonomous-driving vehicle has a right of way in the environment; and generating, based on the determination of whether the autonomous-driving vehicle has the right of way, a vehicle behavior notification to indicate an intent of the autonomous-driving vehicle.

11. The computer-implemented method of claim 10, wherein the target traffic object and the traffic objects are identified based on attributes of the target traffic object and the traffic objects.

12. The computer-implemented method of claim 11, wherein the attributes of the target traffic object and the traffic objects is captured through sensors onboard the autonomous-driving vehicle, and wherein the sensors onboard the autonomous-driving vehicle include at least one of a Lidar or a camera.

13. The computer-implemented method of claim 10, wherein the route associated with the autonomous-driving vehicle is determined based on two or more of a current location, a destination, traffic conditions, weather conditions, environmental conditions, or a number of turns in the route.

14. The computer-implemented method of claim 10, wherein the right of way in the environment is determined based on one or more of traffic rules, traffic signals, or traffic signs associated with a location of the autonomous-driving vehicle and in relation to the target traffic object.

15. The computer-implemented method of claim 10, wherein generating the vehicle behavior notification for the target traffic object comprises:

determining that the autonomous-driving vehicle has the right of way;

determining, based on traffic conditions, that the autonomous-driving vehicle is able to safely proceed; and generating the vehicle behavior notification to indicate an intent of the autonomous-driving vehicle to proceed.

16. The computer-implemented method of claim 10, wherein generating the vehicle behavior notification for the target traffic object comprises:

determining that the autonomous-driving vehicle has the right of way;

determining, based on traffic conditions, that the autonomous-driving vehicle is unable to safely proceed; and generating the vehicle behavior notification to indicate an intent of the autonomous-driving vehicle not to proceed.

17. The computer-implemented method of claim 10, wherein generating the vehicle behavior notification for the target traffic object comprises:

determining that the autonomous-driving vehicle does not have the right of way; and generating the vehicle behavior notification to indicate an intent of the autonomous-driving vehicle to yield to the target traffic object.

18. The computer-implemented method of claim 10, wherein the vehicle behavior notification is at least one of a visual or an acoustic notification, wherein the visual notification includes at least one of changing a color, a pattern, or brightness associated with light generated by at least one light emitting device associated with the autonomous-driving vehicle.

* * * * *